United States Patent
Nusairat et al.

(10) Patent No.: US 9,750,034 B2
(45) Date of Patent: Aug. 29, 2017

(54) APPARATUS AND METHOD FOR REDUCING INTERFERENCE IN A WIRELESS COMMUNICATION SYSTEM

(71) Applicant: Cambium Networks Limited, Devon (GB)

(72) Inventors: Ashraf Nusairat, Hoffman Estates, IL (US); Basman Dahleh, Palos Heights, IL (US)

(73) Assignee: CAMBIUM NETWORKS LIMITED, Ashburton, Devon (GB)

( * ) Notice: Subject to any disclaimer, the term of this patent is extended or adjusted under 35 U.S.C. 154(b) by 91 days.

(21) Appl. No.: 14/137,340

(22) Filed: Dec. 20, 2013

(65) Prior Publication Data
US 2015/0181609 A1 Jun. 25, 2015

(51) Int. Cl.
H04W 4/00 (2009.01)
H04W 72/08 (2009.01)
H04L 5/00 (2006.01)
H04W 72/04 (2009.01)
H04W 72/12 (2009.01)

(52) U.S. Cl.
CPC .......... *H04W 72/082* (2013.01); *H04L 5/006* (2013.01); *H04W 72/0426* (2013.01); *H04W 72/121* (2013.01)

(58) Field of Classification Search
CPC ..... H04W 48/16; H04W 72/08; H04W 72/04; H04L 5/00
See application file for complete search history.

(56) References Cited

U.S. PATENT DOCUMENTS

2008/0056205 A1* 3/2008 Nagai ............... H04J 4/00 370/336
2009/0316815 A1* 12/2009 Glazko .............. H04L 5/0037 375/260
2011/0243073 A1 10/2011 Gong et al.

FOREIGN PATENT DOCUMENTS

| EP | 2 093 898 A1 | 8/2009 | |
| FR | 2093898 A1 * | 8/2009 | ............... H04B 7/00 |
| JP | 2008-187488 A | 8/2008 | |

OTHER PUBLICATIONS

International Search Report and Written Opinion of the International Searching Authority from corresponding International Application No. PCT/GB2014/053761, 16pp., Jul. 6, 2015.
Combined Search and Examination Report for related application No. GB1405546.1, dated Jul. 14, 2014, 6 p.

* cited by examiner

*Primary Examiner* — Donald Mills
*Assistant Examiner* — Abdelillah Elmejjarmi
(74) *Attorney, Agent, or Firm* — Brinks Gilson & Lione

(57) ABSTRACT

In a communication system, an access point in communication with one or more stations identifies a first subset of wireless stations from the set of wireless stations. The first subset of wireless stations is identified based on RSSI values for radio frequency signals received from each of the stations exceeding an RSSI threshold. The first subset of wireless stations is assigned to a first reception window. The access point transmits an identifier of each of the subset of wireless stations and an identifier of the reception window via the radio frequency channel.

15 Claims, 9 Drawing Sheets

APPARATUS AND METHOD FOR REDUCING INTERFERENCE IN A WIRELESS COMMUNICATION SYSTEM

BACKGROUND

The present disclosure relates generally to communication systems. The present disclosure relates more particularly to a mechanism for adjusting characteristics of a communication device based on the signal strength of received radio frequency signals.

Wireless broadband networks have become very popular for data communication. Such networks may be set up relatively inexpensively and quickly. Such networks may provide local communication among network client devices through an access point which controls communication in the network. Instead, or in addition, such networks may provide communication access to remote networks including the Internet.

The Institute of Electrical and Electronics Engineers (IEEE) has promulgated several data communication standards which have subsequently been adopted by industry. One example of a family of such standards is commonly referred to IEEE 802.11. IEEE 802.11 includes several protocols including IEEE 802.11a, IEEE 802.11b, IEEE 802.11g, IEEE 802.11n and IEEE 802.11ac. 802.11 networks and devices are commonly referred to as WiFi devices. The 802.11 protocols define devices and operations that may communicate in a network, including messaging and timing. According to the protocols, an access point or base station controls data communication including timing of communication between the access point and respective stations or client devices in a service area around the access point. Client devices operate according to the same protocol to communicate with the access point. Messaging is defined by the protocol.

To improve the utility of these networks, manufacturers have been expanding the range of communication and thus the size of the service area. Initially, WiFi communication was limited to line of sight or a few tens of meters between transmitter and receiver. More recently, networks are being developed with a service area radius or node size of 5 to 15 km.

Increasing the scale of networks in this manner has met with commercial success. This success has created opportunities for additional features in systems and methods for communication as well as opportunities for improving performance and efficiency.

BRIEF SUMMARY

This disclosure relates to a synchronized WiFi network such as a network according to the Institute of Electrical and Electronics Engineers (IEEE) 802.11n standard. The network includes a plurality of access points (APs). Each AP provides wireless communication service to stations (STAs) in the vicinity of the AP. In the new network, the cell coverage may be 5 miles in diameter, compared to conventional 802.11n.

In some scenarios the service or coverage area of a plurality of access points may overlap. Furthermore, the access points may communicate with their respective stations via the same range of frequency. In these situations, an access point may receive radio signals transmitted by stations that are in communication with the access point as well as from stations that are in communication with another access point. In such a scenario, an access point may implement schemes to minimize the reception of radio signals from stations that are in communication with another access.

In some scenarios, a station may be located in an area where the service areas of two or more access points overlap. The station may be in communication with one of the access points but may receive radio frequency signals from other access points. To minimize the reception of radio frequency signals from the other access points, the station may adjust its hardware characteristics based on the signal strength of the radio frequency signals received from the access points.

DETAILED DESCRIPTION OF THE PRESENTLY PREFERRED EMBODIMENTS

Radio devices described herein respond to receiving radio signals at different power levels from multiple sources by adjusting their receiver characteristics to improve the reception of radio signals from some of the multiple sources. In some embodiments, the receiver characteristics are adjusted based on the power level of the received radio signals and the identity of the multiple sources.

Figure 1:
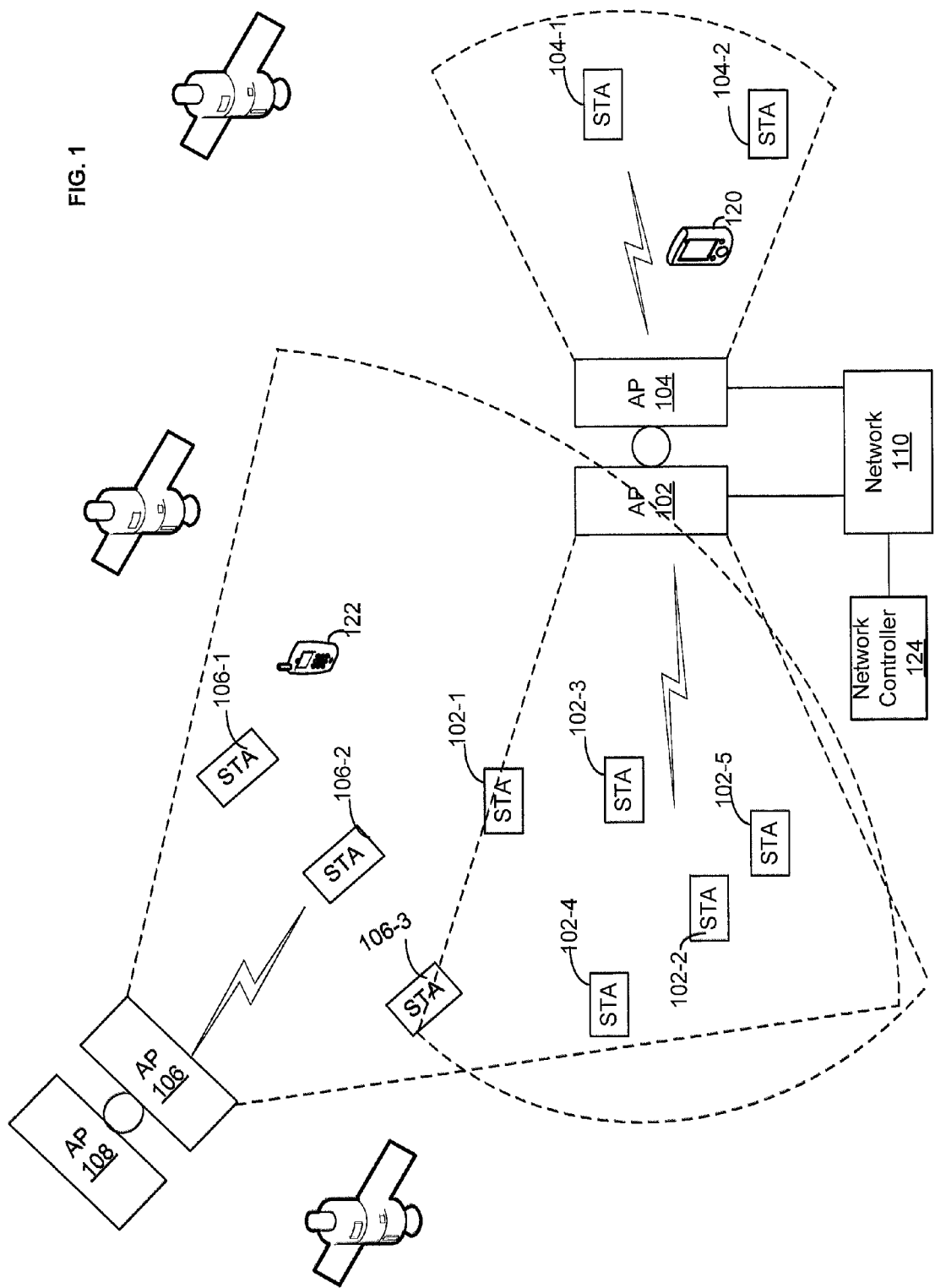
FIG. 1 is a block diagram of an exemplary communication system.

FIG. 1 is a block diagram of an example communication system 100 that includes wireless devices that implement a combination of methods described herein to mitigate the effect of radio frequency interference produced by other wireless devices operating in the vicinity of the wireless devices at the same range of frequencies. The communication system 100 is intended to be exemplary only for purposes of illustrating the concepts described herein.

In this exemplary embodiment, the communication system 100 includes a first access point 102, a second access point 104, a third access point 106 and a fourth access point 108. Each respective access point provides radio communication to a service area indicated by the dashed areas surrounding the respective access point. In the illustrated embodiment, each respective access point 102, 104, 106, 108 operates according to the Institute of Electrical and Electronic Engineers (IEEE) standard 802.11n, commonly referred to as WiFi. In other embodiments, one or more of the access points 102, 104, 106, 108 operates according to another wireless standard such as WiMAX or another of the family of 802.11 standards. The devices and techniques described herein may be extended to standards and protocols other than IEEE 802.11n.

In the example of FIG. 1, each respective access point operates as a base station for radio devices within a cell or service area surrounding the access point. In this example, the access point 102 provides radio communication service to one or more station near the access point. As used herein, radio communication generally refers to the communication of data by the transmission and reception of radio frequency signals representative of the data. Each station (STA) communicates with the access point using a radio communication protocol such as IEEE 802.11n. The radio communication protocol defines frequency allocation, timing, frame structure and other characteristics of the transmission and reception of information between radio devices including the access point and the radio devices. In one embodiment, the radio communication protocol implemented at access points 102, 104, 106 and 108 is configured to allocate the same range of operating frequencies to access points 102, 104, 106 and 108.

In the example of FIG. 1, the access point 102 is in radio communication with five radio devices, including a first station 102-2, a second station 102-2, a third station 102-3, and a fourth station 102-4 and a fifth station 102-5. In this example, the first station 102-1 is designated STA 1, the second station 102-2 is designated STA 2, the third station 102-3 is designated STA 3, the fourth station 102-4 is designated STA 4 and the fifth station 102-5 is designated STA 5. The first station 102-1, second station 102-2, third station 102-3, fourth station 102-4 and fifth station 102-5 may be considered clients of the access point 102 and may be referred to as wireless client devices. An access point such as access point 102 and its corresponding wireless client devices may be referred to as a wireless network. While FIG. 1 shows five stations in radio communication with the access point 102, this is intended to be exemplary only. Any number of stations may communicate with the access point 102. Also, the stations illustrated in FIG. 1 may selectively leave the wireless network and re-enter the network and other stations may enter the wireless network as well. The stations may be mobile and may move in and out of the service area served by the access point 102.

Each of first station 102-2, second station 102-2, third station 102-3, fourth station 102-4 and fifth station 102-5 may include a radio communication circuit in combination with any other suitable device or equipment. Exemplary devices that may include a radio circuit and form a station or wireless client device include a mobile phone, a smart phone, a personal digital assistant (PDA), a laptop computer, a tablet computer, a personal computer and any other data processing device. A radio circuit provides data communication between the data processing device and the access point 102. The radio circuit may be a module or component or group of components and may be a permanent part of the station or may be removable or detachable from the station.

The access point 102 may, in turn, provide data communication between respective stations among the first station 102-2, second station 102-2, third station 102-3, fourth station 102-4 and a fifth station 102-5, or between a respective station and another network 110. The arrangement of access point 102 and stations 102-1, 102-2, 102-3, 102-4 and 102-5 is referred to a point to multi-point (PMP) arrangement or scheme. The network 110 may be any network or combination of networks and may include directly or indirectly the Internet or networks in communication with the Internet.

In the example of FIG. 1, each of the access points 102, 104, 106, 108 is in communication with the network 110. In one embodiment, the operation and configuration of access point 102, 104, 106 and 108 may be controlled by network controller 124. In other embodiments, each of the access points 102, 104, 106, 108 may operate independently with no interaction with adjacent networks and with no overall control or supervision of individual access points. Second access point 104 is in data communication with a STA 120, embodied as a PDA, and stations 104-1 and 104-2. The third access point 106 is in data communication with a STA 122, embodied as a mobile phone and stations 106-1, 106-2 and 106-3. Access point 104 and STA 120, and stations 104-1 and 104-2 comprise a second wireless network and access point 106 and stations 106-1, 106-2, 106-3 and STA 122 constitute a third wireless network.

In some scenarios, the service area surrounding one access point may overlap the service areas of one or more other access points. The service area of an access point may be defined by factors such as the configuration and coverage of antennas which communicate radio signals with radios in the service area, the transmit signal strength of each respective radio, and objects in the service area that may cause signal degradation and interference. When service areas overlap, one access point may receive transmissions from one or more of the other access points. Access points with overlapping service areas may be referred to as neighboring access points, for example, access point 102 and 106 of FIG. 1. A station in the overlapping service area may receive transmissions from its access point and the neighboring access point. For example, station 102-1 may receive radio frequency signals transmitted by access point 102 and access point 106.

In the example of FIG. 1, the access point 102 and the stations 102-1, 102-2, 102-3, 102-4 and 102-5 may receive and transmit data via a radio frequency communication channel in accordance with a time division duplexing (TDD) scheme. A radio frequency communication channel is a defined frequency or band of frequencies that may be shared by multiple radio devices at designated times. In a TTD scheme, wireless devices are scheduled to transmit and receive data via a shared radio frequency channel at pre-assigned points in time. For example, station 102-1 may be scheduled to transmit data at time T1 and receive data at time T4, station 102-2 may be scheduled to transmit data at time T2 and receive data at time T5 and so on. By scheduling each of the wireless devices to transmit and receive data at different points in time, the radio frequency channel may be shared in an orderly fashion. In one example, an access point such as the access point 102 includes a module referred to as a scheduler which determines scheduling and designation of times for communication by respective radios.

In the PMP arrangement of FIG. 1, a TTD scheme may comprise data communications from access point 102 to stations 102-1, 102-2, 102-3, 102-4 and 102-5 for a period of time and data communication from one or more of the stations 102-1, 102-2, 102-3, 102-4 and 102-5 to the access point 102 for a subsequent period of time. Data communicated by access point 102 to stations 102-1, 102-2, 102-3, 102-4 and 102-5 is referred to as downlink data. Downlink data is communicated in logical structures called downlink frames and the time period or duration of a downlink frame is referred to as downlink frame period. In this embodiment, the transmission window discussed above may correspond to the downlink frame. Data communicated from the stations 102-1, 102-2, 102-3, 102-4 and 102-5 to the access point 102 is referred to as uplink data. Uplink data is communicated in logical structures called uplink frames and the time period or duration of a downlink frame is referred to as downlink frame period. Generally, the start of downlink data coincides with or is aligned with the start of a downlink frame and the start of uplink data coincides with or is aligned with the start of an uplink data frame.

Communication between access point 102 and stations 102-1, 102-2, 102-3, 102-4 and 102-5 is accomplished via alternating downlink frames and uplink frames. A downlink frame and an uplink frame together constitute a TDD frame. The time duration of the TDD frame is referred to as a TDD frame duration or period. Wireless networks comprising access points 104, 106 and 108 and the respective stations in data communication with access points 104, 106 and 108 may also operate in accordance with the TDD scheme.

Figure 2:
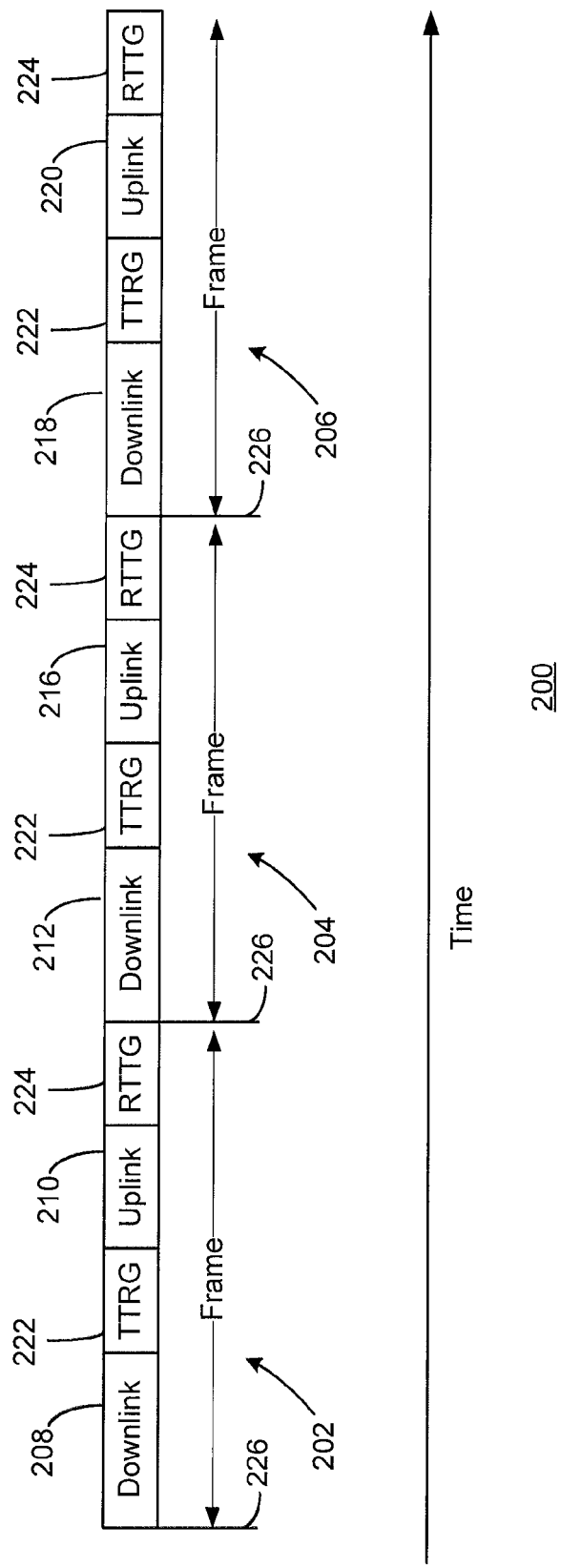
FIG. 2 is a representative diagram of example TDD frames.

FIG. 2 is a timing diagram illustrating operation of the communication system 100 of FIG. 1 in accordance with a TDD scheme. FIG. 2 illustrates a sequence 200 of time division duplex (TDD) frames for wireless communication in a communication system using a network protocol such as 802.11. In particular, the sequence 200 of frames has application in extended range networks such as 802.11n networks having a service area diameter greater than a few tens of meters. The sequence 200 may correspond to data communication between an access point and one or more stations in radio communication with the access point.

The sequence 200 of frames includes a first frame 202, a second frame 204 and a third frame 206. In FIG. 2, time is on the horizontal axis. The first frame 202 includes a downlink frame 208 followed in time by an uplink frame 210. Similarly, the second frame 204 includes a downlink frame 212 followed in time by an uplink frame 214 and the third frame 206 includes a downlink frame 216 followed in time by an uplink frame 218. A subsequent downlink frame 220 indicates a following frame. Each respective downlink frame 208, 212, 216, 220 defines a time period when an access point such as the access point 102 (FIG. 1) transmits to stations or client devices in the service area of the access point. Each respective uplink frame 210, 214, 218 defines a time period when stations or client devices in the service area transmit to the access point. The composition and timing of each downlink or uplink is defined by the network protocol. Each downlink frame and its corresponding uplink frame is separated by transmit to receive gap (TTRG) period 222. Each uplink frame from one frame is separated from the downlink frame of the next frame by receive to transmit gap (RTTG) period 224.

The period of a TDD frame 204 for example, comprises a sum of the period of downlink frame 212, the period of uplink frame 216, TTRG period 222 and RTTG period 224. The duty cycle of a frame is defined as the ratio of the period of downlink frame to the period of the frame. The ratio of the period or duration of the downlink frame 208, for example, to the period of TDD frame 202, for example, is referred to as the duty cycle. The period of the downlink frame and the period of uplink frame may be appropriately configured based on the particular application.

Returning to FIG. 1, in a communication system 100 that comprises several wireless networks with overlapping service areas and which operate via radio frequency channels with the same range of frequencies, an access point of a wireless network may synchronize its timing with other wireless networks of the same technology or other technologies operating in the same frequency ranges. To synchronize access points such as access points 102, 104, 106 and 108, the wireless networks must operate in a time division duplex mode in which all access points transmit at the same time for a fixed duration, then switch to a receive mode for a fixed duration. This is done according to the sequence 200 of TDD frames of FIG. 2. During the downlink frames 208, 212, 216, 220, all access points 102, 104, 106, 108 transmit in synchrony. During the uplink frames, all access points 102, 104, 106, 108 receive in synchrony.

To achieve the discussed synchronous operation, in some embodiments, access points 102, 104, 106 and 108 may be configured to receive global position satellite (GPS) signals from GPS satellites 128, 130 and 132. Based on the GPS signals, access points 102, 104, 106 and 108 may generate synchronization events. In an embodiment, transmission of downlink frames by access points and transmission of uplink frames by stations may be configured to occur in response to the generated synchronization events. Because the synchronization events generated by the access points 102, 104, 106 and 108 are based on the same GPS signals, transmission of downlink frames and uplink frames occur in near synchrony. With reference to FIG. 2, in the context of a TDD scheme, access points may schedule the transmission of TDD frames 202, 206 and 208 in response to receiving a synchronization event corresponding to time 226.

However, synchronized operation using the same range of frequencies allows a station such as station 102-2 to receive radio frequency signals from its access point 102 and neighboring access point 106. The received radio frequency signals are representative of the downlink data communicated in downlink frames transmitted by access points 102 and 106. An access point similarly receives radio frequency signals transmitted by stations in its vicinity. For example, access point 102 may receive uplink data not only from its client wireless devices 102-1, 102-2, 102-3, 102-4 and 102-5 but also from one or more stations 104-1, 104-2, 120, 106-1, 106-2, 106-3 and 122 (neighboring stations).

Figure 3:
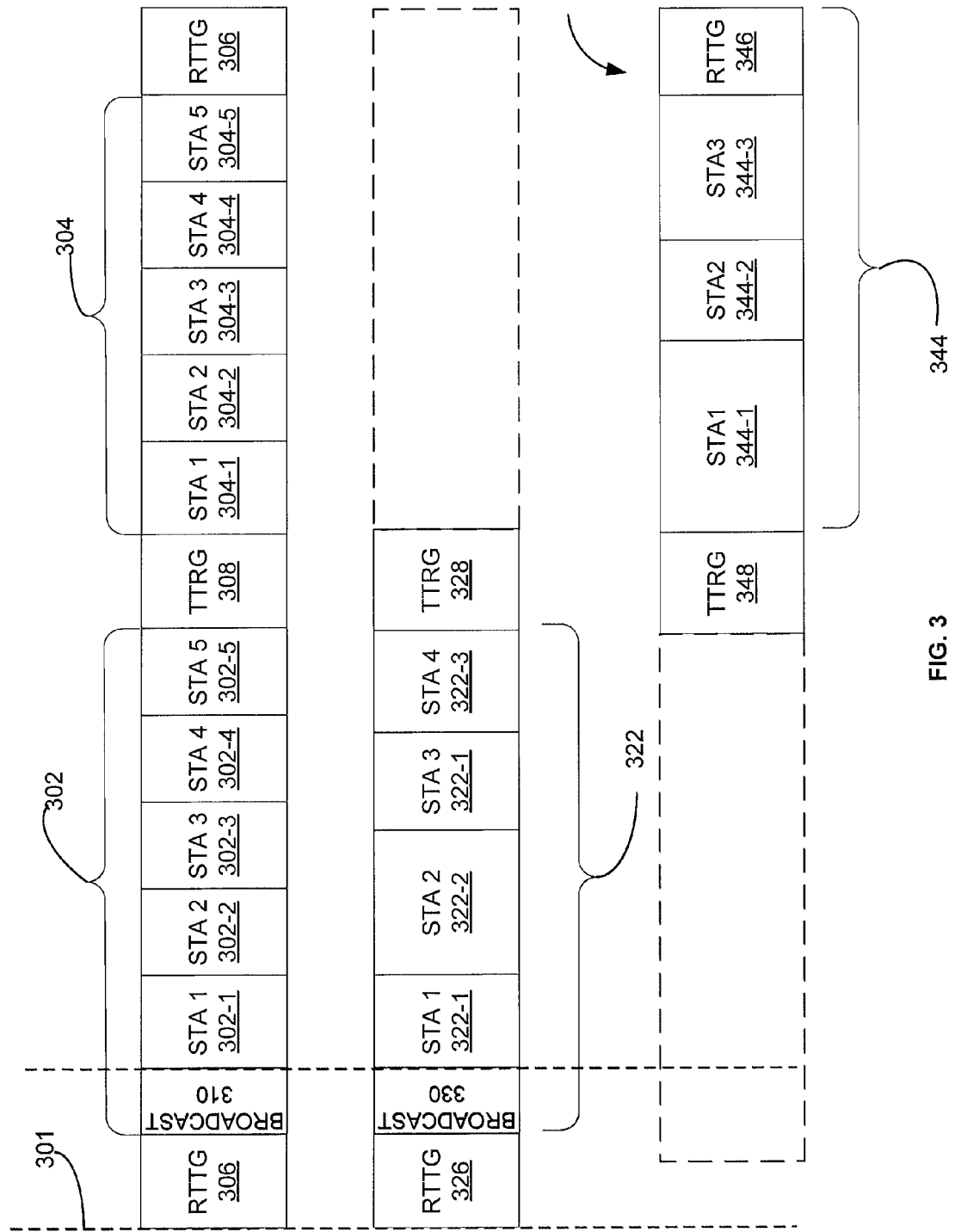
FIG. 3 is a timing diagram of TDD frames that may be communicated in the communication system of FIG. 1

FIG. 3 depicts a detailed view of three TDD frames 300, 320 and 340 that may be communicated via the same radio frequency communication channel. TDD frame 300 comprises downlink frame 302 and uplink frame 304. Downlink frame 302 comprises broadcast data slot 310, and downlink data portions or slots 302-1, 302-2, 302-3, 302-4 and 302-5. Uplink frame 304 comprises uplink data portions or slots 302-1, 302-2, 302-3, 302-4 and 302-5. Downlink frame 322 of TDD frame 320 comprises broadcast data 330 and downlink data slot 322-1, 322-2, 322-3 and 322-4. Uplink frame 342 of TDD frame 340 comprises uplink data slots 342-1, 342-2 and 342-3.

An access point may communicate information in broadcast data slot 310 that wireless client devices in the wireless network utilize to determine the position of their respective downlink data slots in downlink frame 302 and uplink data slots in uplink frame 304. The position information may be represented as a time offset from start 301 of TDD frame 300, in an embodiment. The position information may be referred to as a schedule. The schedule may specify for example when during the corresponding uplink frame a station should communicate data to the access point and the time apportioned to each station. As an example, the schedule may specify the uplink (304-1, 304-2, 304-3, 304-4 and 304-5) and downlink slot times (302-1, 302-2, 302-3, 302-4 and 302-5) assigned to stations in radio communication with the access point. The slot times may be represented as time offsets from the synchronization events.

The downlink frame 302 may correspond to a downlink frame transmitted by access point 102 and the uplink frame 304 may correspond to uplink data transmitted by stations 102-1, 102-2, 102-3, 102-4 and 102-5. Access point 102 communicates data to station 102-2 in downlink data slot

302-1. Similarly, downlink data slots 302-2, 302-3, 302-4 and 302-5 may correspond to data communicated by access point 102 to stations 102-2, 102-3, 102-4 and 102-5, respectively.

Downlink frame 322 may correspond to a downlink frame transmitted by access point 106. Access point 106 may communicate data to stations 106-1, 106-2, 106-3 and 122 in downlink data slots 322-1, 322-2, 322-3 and 322-4, respectively, in accordance with the schedule communicated via broadcast data 330. Because the operation of access point 102 and 106 is synchronized, downlink link frame 302 and 322 are transmitted substantially simultaneously by access points 102 and 106, respectively. Uplink frame 340 may correspond to uplink data transmitted by stations 104-1, 104-2 and 120 in uplink data slots 342-1, 342-2 and 342-3, respectively.

One consequence of synchronized operation of different wireless networks via the same radio frequency communication channel is that a station located in the overlapping service areas of two access points may receive downlink frames transmitted from both of the access points nearly simultaneously. For example, a station such as 102-2 receives radio frequency signals from its access point 102 and neighboring access point 106. The received radio frequency signals are representative of the downlink data communicated in downlink frames transmitted by access points 102 and 106. Station 102-2 will receive radio frequency signals representative of downlink data slot 302-1 of downlink frame 302 and downlink data slot 322-1 of downlink frame 322.

Generally, the signal strength of radio frequency signals decreases with increasing distances from the source of the radio frequency signals. With reference to FIG. 1, because the distance XXX between station 102-2 and access point 102 is less than the distance YYY between station 102-2 and access point 106, the signal strength of radio frequency signals received by station 102-2 (receive signal strength) from access point 102 is greater than the receive signal strength of radio frequency signals transmitted by station 106.

In an exemplary embodiment, station 102-2 measures the receive signal strength of radio frequency signals transmitted by both access points 102 and 106 and configures its hardware characteristics to disregard radio frequency signals having receive signal strengths less than or equal to the signal strength of radio frequency signals received from access point 106. Thus, in an exemplary embodiment, station 102-2 may receive radio frequency signals representative of downlink data slot 302-2 and not receive radio frequency signals representative of downlink data slot 322-2.

An access point similarly receives radio frequency signals corresponding to uplink data transmitted by stations in its vicinity. The receive signal strength of the radio frequency signals transmitted by the stations and measured by the access point may be different, in part because the stations are at different distances from the access point.

With reference to FIG. 3, access point 102 may receive uplink frames 304 and 344. As previously stated, uplink frame 304 may correspond to uplink data transmitted by wireless client devices of the access point 102, including stations 102-1, 102-2, 102-3, 102-4 and 102-5. Specifically, uplink data slots 304-1, 304-2, 304-3, 304-3, 304-4 and 304-5 includes uplink data transmitted by station 102-2, 102-2, 102-3, 102-4 and 102-5, respectively. Uplink frame 344 may correspond to uplink data transmitted by stations 104-1, 104-2 and 120. The access point 102 receives radio frequency signals from each of the stations at different signal strengths.

In an exemplary embodiment discussed in detail later, access point 102 may group its wireless client devices, stations 102-1, 102-2, 102-3, 102-4 and 102-5 based on the receive signal strength of their respective radio signals. The access point 102 may compute a threshold based on the receive signal strength of radio frequency signals corresponding to uplink data in uplink slots 344-1, 344-2 and 344-3.

Wireless client devices with a receive signal strength above the threshold may be assigned to a first group and stations with a receive signal strength below the threshold may be assigned to a second group. Group assignments of the client devices may be made by the access point or any other suitable network component. Access point 102 may instruct stations in the first group to transmit uplink data during a first uplink frame of a first TDD frame and stations in the second group to transmit uplink data during a second uplink frame of a second TDD frame. Access point 102 may communicate the instructions via information in the broadcast data slot of the first downlink frame of the first TDD frame and the second downlink frame, in an embodiment. Access point 102 may adjust its hardware characteristics during the first uplink frame and the second uplink frame to minimize the reception of radio signals corresponding to uplink data in uplink data slots 344-1, 344-2 and 344-3, in this embodiment.

Figure 4:
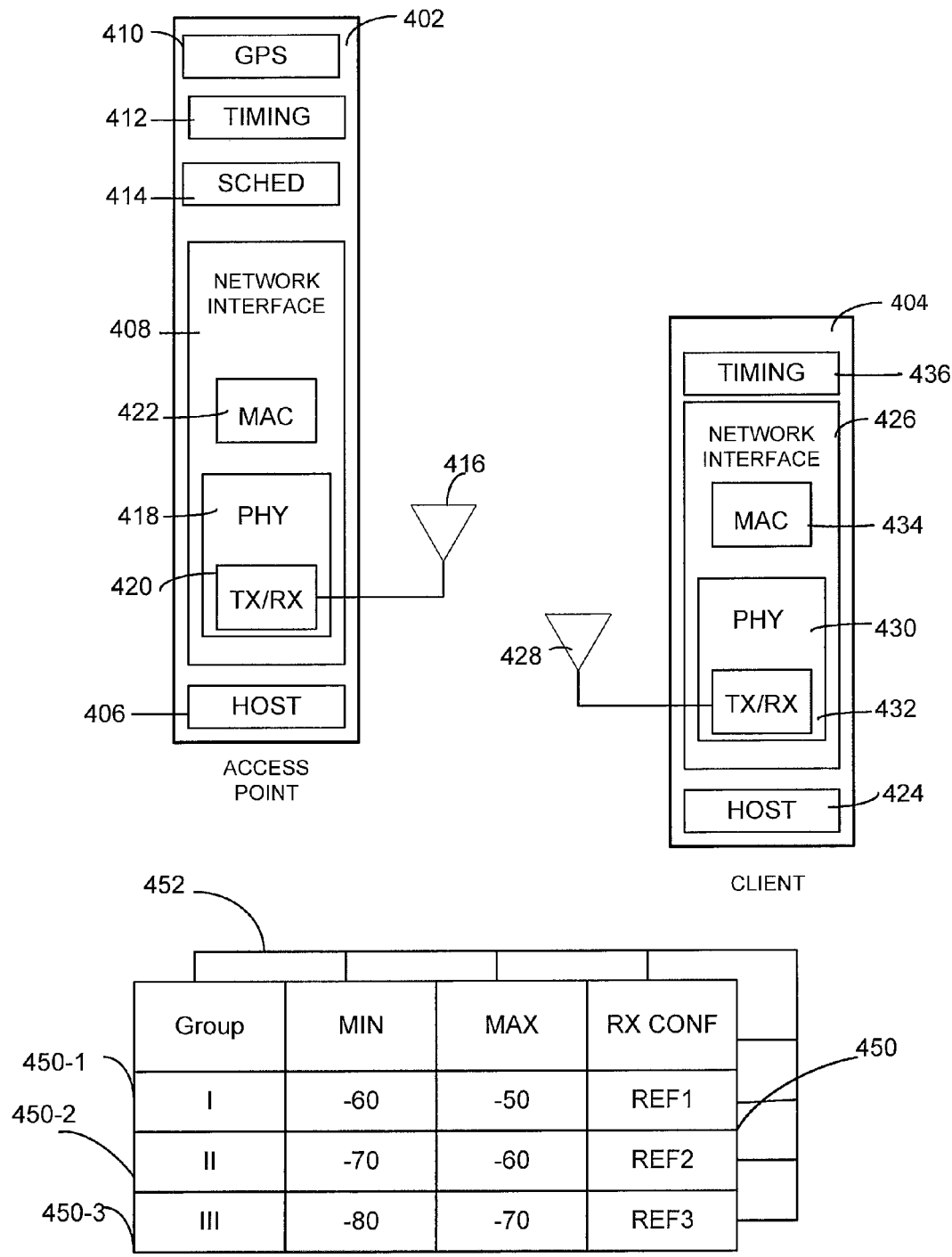
FIG. 4 is a block diagram of a representative access point and representative client device.

FIG. 4 is a block diagram of a representative access point 402 and representative client device 404. The access point 402 may be representative of one of the access points 102, 104, 106, 108 of FIG. 1. Similarly, the client device 404 may be representative of one of the stations 102-1, 102-2, 102-3, 102-4 and 102-5 in FIG. 1. However, the embodiments shown are intended to be exemplary only.

The access point 402 includes a host processor 406, a network interface 408, a global positioning system (GPS) circuit 410, a timing circuit 412, a scheduler 414 and an antenna 416. In other embodiments, the access point 402 may include more or fewer or alternative elements relative to those shown in FIG. 4.

The host processor 406 controls operation of the access point 402. The host processor may include one or more circuits, modules, interfaces or code for implementing control functions. For example, the host processor 406 may include a microprocessor and memory. The memory may store data and instructions for controlling the microprocessor and other components of the access point 402. The microprocessor in turn may operate in response to the stored data and instructions to control operation of the access point.

The network interface 408 controls data communication between the access point 402 and other devices, including the client device 404. The network interface 408 controls wireless communication using the antenna 416. In this regard, the network interface 408 may implement one or more radio circuits to transmit and receive radio communications by means of the antenna 416. The network interface 408 implements a physical layer (PHY) 418 in accordance with the Open Systems Interconnection (OSI) model of computer networking and a transmitter and receiver circuit (TX/RX) 420. In some embodiments the network interface 408 may be implemented in a single commercial semiconductor device or chipset. Examples of such chipsets include Avastar 88W8764 and Atheros AR9002U UB94.

The transmitter portion of TX/RX 420 is adapted to transmit a radio signal representation of the downlink frame of a TDD frame. The transmitter portion of TX/RX 320 may apply the appropriate modulation and coding schemes (MCS) as specified by the 802.11 standard to the downlink frame before transmission. The transmitter portion may also include mixers, frequency synthesizers, digital to analog convertors, power amplifier etc.

The receiver portion of TX/RX 320 is configured to receive radio signal representations of uplink frames of TDD frames. The receiver decodes the radio signals to recover the uplink data. The receiver includes amplifiers, automatic gain control circuits, IF amplifiers, demodulators etc. The receiver may also measure characteristics of the received radio signals including the receive power or signal strength, the signal to noise ratio (SNR) of a received radio signal and the carrier interference to noise ratio (CINR). The receive signal strength is frequently referred to as the receive signal strength intensity (RSSI). Further, the network interface 408 implements a media access control layer (MAC) 322 in accordance with the OSI model. The MAC 422 may control the operation of the PHY 418 including configuring the appropriate MCS.

In an exemplary embodiment, hardware characteristics of receiver portion of TX/RX 420 may be adjusted based on the RSSI of radio frequency signals received from stations. In this embodiment, adjusting the hardware characteristics may include decreasing the sensitivity of the receiver portion of TX/RX 420. Sensitivity is generally defined as the lowest receive signal strength at which the receiver can detect a radio frequency signal and demodulate data represented by the radio frequency signal. Demodulation is the process of extracting the original information-bearing signal from a modulated radio frequency signal.

By dynamically adjusting (increasing or decreasing) the sensitivity of a receiver, receiver portion of TX/RX 420, for example, access point 402 may control which transmissions received from neighboring stations are demodulated based on the respective signal strengths (RSSI) of received radio frequency transmissions. For example if the RSSI of a radio frequency signal transmitted by a station and as measured at receiver portion of TX/RX 420 is -100 dBm and if the sensitivity of receiver portion of TX/RX 420 is decreased to -90 dBm, the receiver portion of TX/RX 420 may be prevented from detecting and demodulating the radio frequency signal. Conversely, if the sensitivity of receiver portion of TX/RX 420 increased to -105 dBm, receiver portion of TX/RX 420 may detect and demodulate the radio frequency signal. Thus, by decreasing the sensitivity, access point 402 may prevent low RSSI radio frequency signals, such as those transmitted by stations not part of the wireless network of access point 402 from being demodulated.

In one embodiment, the network interface 408 implements the IEEE 802.11n protocol, including the 802.11n PHY and MAC layers. The network interface 308 may also or instead implement other data communication protocols for both wireless and wire line communication. For example, the network interface 408 may control communication to other wire line network elements such as network 110 of FIG. 1. In this regard, the network interface may implement protocols such as Ethernet or internet protocol (IP) for communication with other network elements.

The network interface 408 may include data processing circuits such as one or more processors, circuits, interfaces, modules and memory for implementing network control and communication. Moreover, the network interface 408 may include analog circuitry such as amplifiers, oscillators and filters for data communication with the antenna 416.

The antenna 416 may be any suitable device or combination of devices for transmission and reception of signals. In one example, the antenna 416 is a multiple-input, multiple-output (MIMO) antenna array for data communication. In one particular embodiment, the antenna 416 is configured for communication according to the IEEE 802.11 protocol at frequencies such as 2.4 GHz and 3.7 GHz and 5 GHz. Also, the antenna 416 may include multiple structures for communication of other signals such as GSM signals.

The GPS circuit 410 receives GPS signals or other location determination signals such as GLONASS signals. In response to the received location determination signals, the GPS circuit 410 determines geographic location of the access point 402. Also, in response to the received location determination signals, the GPS circuit 410 determines the current time with high precision. The GPS circuit 410 may communicate data about the geographic location of the access point and about the current time to other components of the access point 402, such as the timing circuit 412. The GPS circuit 410 may also generate the previously discussed synchronization event used to synchronize the transmission of TDD frames of access points 102, 104, 106 and 108.

The timing circuit 412 controls timing of the access point 302. The timing circuit 412 may receive current time data and other timing information from the GPS circuit 410. In turn, the timing circuit 412 conveys timing information to other components of the access point 402. The timing information may include data defining the current time, clocking signals, alarm signals and other information. The access point 402 may include suitable means for data communication among its components such as data and control buses by which information such as timing information may be communicated.

The scheduler 414 operates to control timing of transmissions from the access point 402. The scheduler performs functions such as sorting of frames, deciding what frames may be aggregated and timing frame transmissions.

As discussed in the preceding paragraphs, the receiver portion of TX/RX 320 may measure the signal strength of the received radio signals that correspond to uplink data transmitted by neighboring stations. For example, scheduler 414 of access point 102 (FIG. 1) may cause receiver TX/RX 320 to measure and report the RSSI of received radio frequency signals, in one embodiment. With reference to FIG. 3, in this embodiment scheduler 414 may cause the receiver portion of TX/RX 320 to measure and report the RSSI of radio signals corresponding to uplink data received during uplink data slots 304-1, 304-2, 304-3, 304-4, and 304-5 of uplink frame 304 transmitted by wireless client devices associated with the access point 102, stations 102-1, 102-2, 102-3, 102-4 and 102-5, respectively. Scheduler 414 may cause the receiver portion of TX/RX 320 to measure and report the RSSI of radio signals corresponding to uplink data received during uplink data slots 344-1, 344-2 and 344-3 of uplink frame 344 transmitted by access point 104's wireless client devices, stations 104-1, 104-2, and 120, respectively.

In an embodiment, scheduler 414 may determine a threshold based on the RSSI of radio signals corresponding to uplink frame 344. The threshold may correspond to an average of the RSSI of the radio signals corresponding to uplink frame 344, in an embodiment.

Scheduler 414 may compare the RSSI of radio signals received during each of the uplink data slots of uplink frame 304 with the threshold. Scheduler 414 may group wireless client devices of access point 102 based on the comparison of the RSSI of their respective radio frequency signals with the threshold. As an example, radio frequency signals from wireless client devices with RSSI values that exceed the threshold by 20 dB may constitute a first group and radio frequency signals from wireless client devices with RSSI values that are below the threshold may constitute a second group.

Scheduler 414 generates and transmits a communication schedule (broadcast data 310) during the downlink frame of each TDD frame. In an embodiment, the communication schedule transmitted during a first TDD frame may instruct stations in the first group to transmit uplink data during the uplink frame of the first TDD frame. Scheduler 414 may configure the hardware characteristics of receiver TX/RX 320 based on the determined threshold during the uplink frame of the first TDD frame. For example, scheduler 414 may decrease the sensitivity of the receiver TX/RX 320 for the period corresponding to the first uplink frame period. In an embodiment, adjusting the sensitivity of the receiver TX/RX 320 comprising adjusting automatic gain control (AGC) registers in the receiver TX/RX 320. In an embodiment, RSSI levels determined during a previous uplink frame period may be used to determine an AGC level that will be used to configure receiver TX/RX 320 during the first uplink frame period when data from stations instructed to transmit data during the first uplink frame period is received. Separately, a different AGC level will be determined that will be used to configure receiver section of TX/RX 320 during the second uplink frame period when data from stations instructed to transmit data during the second uplink frame period is received. Thus, the AGC registers of receiver TX/RX 320 is dynamically configured for each uplink frame period.

The communication schedule includes respective data for each respective station served by the AP. The respective data includes data identifying the intended recipient station (station identifier) and data defining the communication timing or other schedule information for that intended recipient station. The station identifier may correspond to a unique identifier of the station, media access control (MAC) address for example. The communication timing for a station may correspond to a time offset from a predefined point in time, 226 of FIG. 2 for example. The respective data for each respective station may be placed in respective time slots of the downlink frame, or communicated in any other suitable manner. The respective data for a respective station may also include a transmit power level. The respective station may transmit data at the specified time offset and at the specified transmit power level during uplink frame 210, for example.

In another embodiment, scheduler 414 may utilize data stored in table 450 to group its wireless client devices based on the RSSI of their respective radio frequency signals. Table 450 may be stored in the memory (not shown) of host 406, in accordance with one embodiment. By way of example and without limitation, table 450 comprises entries 450-1, 450-2 and 450-3. In this embodiment, wireless client devices with RSSI values less than −50 dBm and greater than or equal to −60 dBm are assigned to group I. Similarly wireless client devices with RSSI values less than −60 dBm and greater than or equal to −70 dBm are assigned to group II, and so on.

Scheduler 414 may instruct wireless client devices associated with group 1 to transmit uplink data during a first uplink frame. Scheduler 414 may configure or change receiver of TX/RX 320 for the duration corresponding to the first uplink frame with one or more receiver configuration parameters (REF 1) stored in table 450 and associated with group 1. Receiver configuration parameters may include receiver chipset settings, automatic gain control setting, etc. Changing the receiver configuration parameters may have the effect of decreasing or increasing the sensitivity of receiver of TX/RX 320. Similarly, scheduler 414 may instruct wireless client devices associated with group 2 to transmit uplink data during a second uplink frame and configure receiver TX/RX 320 with configuration parameters corresponding to REF 2, and so on.

Subsequently, upon the occurrence or detection of a change in communication environment, the scheduler may change or update or reconfigure the receiver according to settings appropriate for the changed condition.

In another embodiment, access point 102 may include a second table 452. As previously discussed, scheduler 414 may determine a threshold based on the RSSI of radio signals corresponding to uplink data received from stations that are not wireless client devices of access point 102 (uplink frame 344). In this embodiment, table 450 may be utilized to group wireless client devices when the threshold is within a first range of threshold values and table 452 may be utilized to group wireless client devices when the threshold is within a second range of threshold values.

The scheduler 414 may include any suitable combination of circuits, processors, interfaces, memory or code for performing the necessary functions. In the example of FIG. 3, the scheduler 414 is a separate component of the access point 402. In some embodiments, however, the scheduler 414 may be implemented by other components such as the network interface 408 or the host processor 406.

The client device 404 includes a host processor 424, a network interface 426, an antenna 428 and a timing circuit 436. In other embodiments, the client device 404 may include other components providing other functionality. For example, in embodiments where the client device 404 is a mobile phone, the client device 404 includes a call processor circuit, a user interface and possibly other components such as a camera and accelerometers. In embodiments where the client device 404 is a portable computer, the client device 404 may include a keyboard, a display and a hard disk drive or other mass storage. In some embodiments, the client device 404 may be a module within a host device such as the portable computer or mobile phone.

The host processor 424 controls operation of the client device 404. The host processor 424 may include one or more circuits, modules, interfaces or code for implementing control functions. For example, the host processor 424 may include a microprocessor and memory. The memory may store data and instructions for controlling the microprocessor. The microprocessor in turn may operate in response to the stored data and instructions to control operation of the client device 404.

The network interface 426 controls data communication between the client device 404 and other devices, including the access point 402. The network interface 426 controls wireless communication using the antenna 428. In this regard, the network interface 426 may implement one or more radio circuits to transmit and receive radio communications by means of the antenna 428. In the illustrated embodiment, the network interface 426 implements a physical layer (PHY) 430 as well as a transmitter and receiver circuit (TX/RX) 432. Further, the network interface 326 implements a media access control layer (MAC) 434 in accordance with the OSI model. The network interface 426 forms a radio circuit for radio communication with a remote access point or other radio device.

The transmitter and receiver circuit (TX/RX) 432 is configured to synchronize its operation to a downlink frame received from an access point. The receiver portion of TX/RX 432 is configured to receive radio frequency signals representative of downlink data transmitted by access points. The receiver portion of TX/RX 432 (receiver) decodes the radio signals to recover the downlink data. In a typical embodiment, receiver includes amplifiers, automatic gain control circuits, IF amplifiers, demodulators and other conventional signal processing components. The receiver may also measure characteristics of the received radio signals including the receive power or signal strength, the signal to noise ratio (SNR) of a received radio signal and the carrier interference and noise ratio (CINR). Any suitable circuit or component for measuring such characteristics may be used for this purpose. The measurement may be expressed as a signal level such as a voltage or a current or as a data value or as a power level in decibels.

In one embodiment, the network interface 426 implements the IEEE 802.11n protocol, including the 802.11n PHY layer 330 and MAC layer 434. In this regard, the client device 404 forms or is a part of an 802.11 station or STA. The network interface 426 may also or instead implement other data communication protocols for both wireless and wire line communication. For example, the network interface 326 may control communication to other components of the client device 304.

The network interface 426 may include data processing circuits such as one or more processors, circuits, interfaces, modules and memory for implementing network control and communication. Moreover, the network interface 426 may include analog circuitry such as amplifiers, oscillators and filters for communication with the antenna 428.

The antenna 428 may be any suitable device or combination of devices for transmission and reception of signals. In one example, the antenna 428 is a multiple-input, multiple-output (MIMO) antenna array for data communication. In one particular embodiment, the antenna 428 is configured for communication according to the IEEE 802.11 protocol at frequencies such as 2.4 GHz and 3.7 GHz and 5 GHz. Also, the antenna 428 may include multiple structures for communication of other signals such as GSM signals.

The timing circuit 436 maintains timing and synchronization information for the client device 404. In one example, the client device receives timing or synchronization information periodically from the access point 402. This information may come in the form of a beacon signal transmitted by the access point 402. By synchronizing the timing information transmitted in the beacons to the periodic synchronization event, the local times of the stations may be synchronized to the periodic synchronization event. The stations may accordingly schedule the start of their respective portions of uplink frames at appropriate times during the uplink frame.

In operation, the access point 402 and client device 404 are in selective wireless data communication. The access point 402 operates as a base station and provides data communication in a service area adjacent to the access point 402 to client devices or stations such as the client device 404. Data communication is conducted according to a protocol such as IEEE 802.11. The access point 402 operates as a host or server to client devices such as the client device 404 in the service area and establishes a communication network for the stations in the service area.

Figure 5:
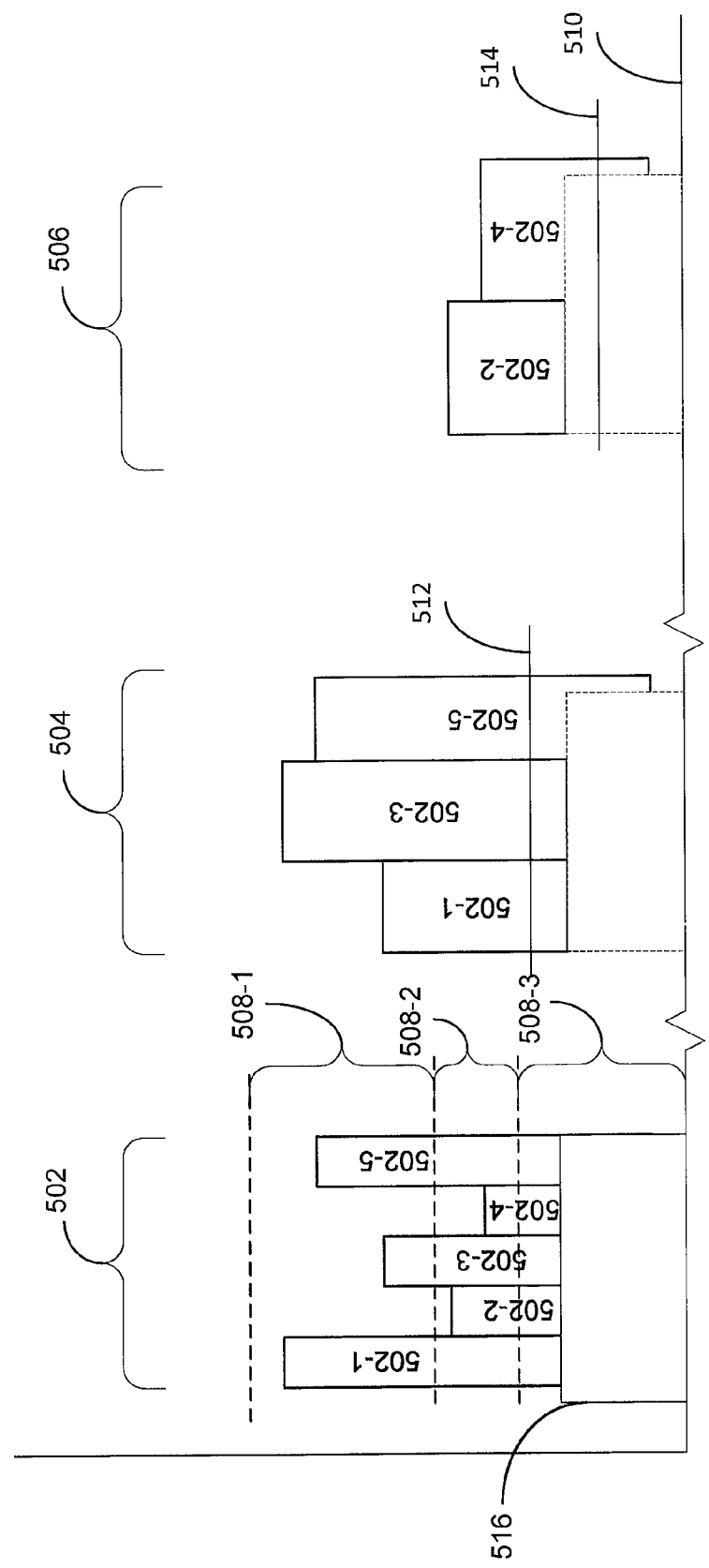
FIG. 5 is a timing diagram of TDD frames that may be communicated in the communication system of FIG. 1.

FIG. 5 is a timing diagram 500 of an example scenario where an access point such as access point 102 (FIG. 1) groups wireless client devices based on the RSSI of their respective radio frequency signals and adjusts characteristics based on the RSSI of the wireless client devices assigned to the group. In some scenarios, an access point may also receive radio frequency signals from neighboring wireless devices that are not clients and decode the radio frequency signals to identify the non-client neighboring stations. Generally, a non-client neighboring station corresponds to a wireless device which is not in communication with the access point and which transmits radio frequency signals that may be decoded by the access point. The radio frequency signals received by the access point from the non-client neighboring station are interference signals. For example, with reference to FIG. 1, radio frequency signals received by access point 102 from stations 104-1, 104-2 and access point 106 for example constitute interference radio frequency signals. In these scenarios, the access point may detect the RSSI of these radio frequency transmissions and based on the detected RSSI and the identity of the non-client neighboring stations, the access point may adjust the characteristics of its receiver to prevent the access point from decoding and synchronizing to the radio frequency signals received from these non-client neighboring stations.

The vertical axis of the timing diagram corresponds to the receive signal strength of received radio frequency signals as detected by the receiver of access point 102. Uplink frame 502 comprises uplink data slots 502-1, 502-2, 502-3, 502-4 and 502-5. The vertical height of the uplink data slots corresponds to the relative RSSI of radio frequency signals. The horizontal width of the slot corresponds to the uplink data slot period assigned by scheduler 414. In this example, uplink frame 516 comprises uplink data transmitted by stations 104-1, 104-2 and 120. The stations 104-1, 104-2 and 120 are neighboring wireless devices that are not clients of access point 102.

Uplink data slots 502-1, 502-2, 502-3, 502-4 and 502-5 may correspond to data transmitted by stations 102-1, 102-2, 102-3, 102-4 and 102-5, respectively. Level 510 corresponds to the noise floor level. The noise floor level sets the lowest received signal power level, RSSI for example, that can be decoded by the receiver, TX/RX 320 for example. The lowest received signal power level that can be decoded by a receiver may also be referred to as the minimum discernible signal level. The RSSI of the received radio frequency signals are measured with reference to this noise floor level. The noise floor level can be changed (moved up or down) by adjusting the AGC settings in receiver TX/RX 320, in an embodiment. As the noise floor level is raised by adjusting software programmable hardware settings in the receiver, TX/RX 320 for example, interfering radio frequency signals like those received from neighboring wireless devices having RSSI signal levels below the noise floor will not be decoded by the receiver. Radio frequency signals with RSSI below the noise floor level 510 may not be detected.

Because uplink frame 516 is above the noise floor level 510, in some scenarios access point 102 may receive and decode uplink frame 516, although uplink frame 516 does not include any data from stations in communication with access point 102. With reference to FIG. 5, by elevating the noise floor above the signal level of uplink frame 516, reception of uplink frame 516 by the access point 102 may be prevented. One consequence of elevating the noise floor level above the signal level of uplink frame 516 is that access point 102 will not attempt to synchronize to and decode uplink frame 516 and will instead decode uplink frames that include data transmitted by stations that are in actual communication with access point 102.

Ranges 508-1, 508-2 and 508-3 correspond to different ranges of RSSI values. For example, range 508-1 may correspond to minimum and maximum RSSI values for entry 450-1 (group 1) of table 450. Range 508-2 corresponds to minimum and maximum RSSI values for entry 450-2 (group 2) of table 450. Range 508-3 corresponds to minimum and maximum RSSI values for entry 450-3 (group 3) of table 450.

Based on the RSSI of the radio frequency signals and data from the decoded radio frequency signals, scheduler 414 may identify stations 102-1, 102-3 and 103-5 as belonging to a first group. Accordingly, access point 102 may schedule stations 102-1, 102-3 and 102-5 to transmit uplink data during uplink frame 504. In one embodiment, a scheduler of an access point such as scheduler 414 (FIG. 4) may adjust receiver characteristics to elevate the noise floor level 510 to new first noise floor level 512. Because the amplitude of the uplink frame 516 is below the new first noise floor level 512, uplink frame will not be decoded.

In one embodiment, a scheduler of an access point such as scheduler 414 (FIG. 4) assigns stations 102-2 and 102-4 to transmit uplink data during uplink frame 506. During the time period corresponding to uplink frame 506, scheduler 414 may adjust the noise floor 510 to a second new noise floor level 514.

In some scenarios, elevating the noise floor level has the effect of decreasing the signal to noise ratio (SNR) of the received radio frequency signals. For example, 518 corresponds to the SNR of radio signals received from station 102-5 before elevation of the noise floor and 516 corresponds to the SNR of radio signals received from station 102-5 after elevation of the noise floor to 512.

MAC 422 (FIG. 4) determines the SNR for each uplink frame slot from the RSSI of the radio frequency signal received during the uplink time slot and the noise floor level. Generally, MAC 422 (FIG. 4) selects a modulation and coding scheme (MCS) that is used to encode radio frequency signals transmitted to a station based on the SNR of the radio frequency signals received from the station. The MCS may be varied as channel quality varies to maintain the best data throughput for current circumstances. The MCS determines the rate at which data may be communicated via a radio frequency communication channel. Higher modulation schemes are associated with increased data throughput. However, higher modulation schemes require higher SNR values. Because elevating the noise floor results in lower SNR, stations assigned to a group where the noise floor is elevated may encounter decreased data throughput. Decreased data throughout is reflected by a decreased data rate. The decreased data rate is caused by the change in MCS that results when the noise floor is elevated. As an example, the modulation scheme may be changed from 256 QAM to 64 QAM when the noise floor is elevated. As a result, the data rate may change from a data rate of 4 Megabits/sec (Mbps) to 1 Mbps.

In an embodiment, to account for the decreased data throughput, scheduler 414 may increase the uplink and downlink slot periods assigned to the stations to maintain their respective data throughput. Allowing a station to receive and transmit for a longer period of time at a lower data rate allows enables maintenance of the guaranteed data throughput rates.

In other embodiments, a station whose data throughput is adversely affected by changing channel quality may be assigned to TDD frames more frequently. For example, with reference to FIG. 5, if stations assigned to group 2 encounter data throughput degradation because of shifting the noise floor to second new noise floor level 516, scheduler 414 may schedule the stations 102-2 and 102-4 to TDD frames more frequently.

Figure 6:
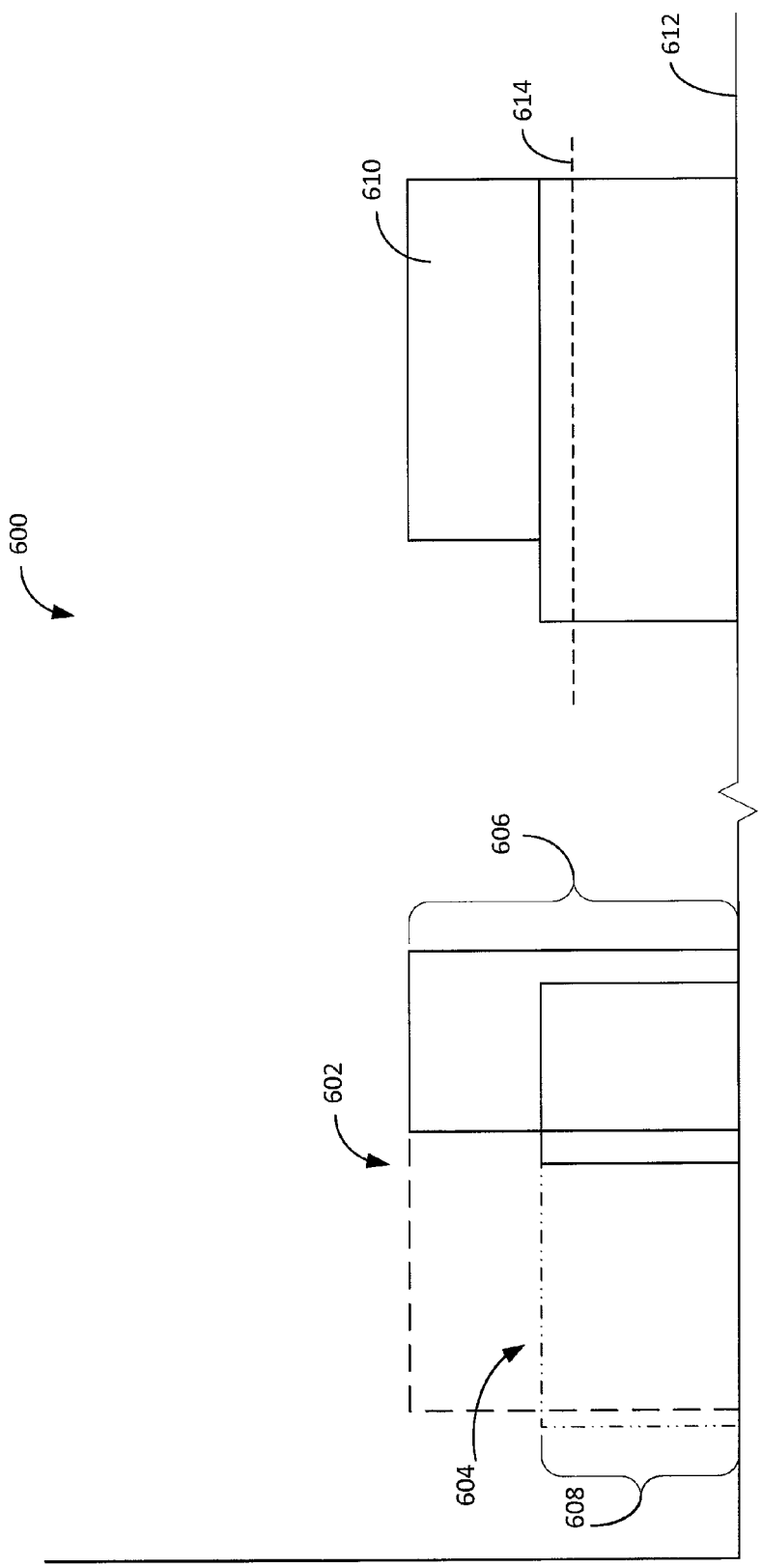
FIG. 6 is another timing diagram illustrating communication of TDD frames by wireless devices of communication system of FIG. 1.

The timing diagram 600 of FIG. 6 illustrates a scenario where client device 404 receives a first downlink frame 602 and a second downlink frame 604. Client device 404 may correspond to station 102-2 of FIG. 1. Downlink frame 602 may correspond to a downlink frame transmitted by access point 102 and downlink frame 604 may correspond to a downlink frame transmitted by access point 106. The vertical axis of the timing diagram corresponds to the receive signal strength of received radio frequency signals as detected by the receiver portion of TX/RX 432 (receiver). The horizontal axis corresponds to time. The receiver of TX/RX 432 measures the receive signal strength 606 and 608 for radio frequency signals corresponding to downlink frame 602 and downlink frame 604, respectively. Based on the receive signal strength 608, station 102-2 may determine a new noise floor level 614 which is elevated from the original noise floor level 612. Characteristics of receiver of TX/RX 432 may be adjusted to elevate the noise floor to the new noise floor level 614 from the original noise floor level 612. During a subsequent downlink frame 616, station 102-2 may receive downlink data 610 with the new receiver settings.

Figure 7:
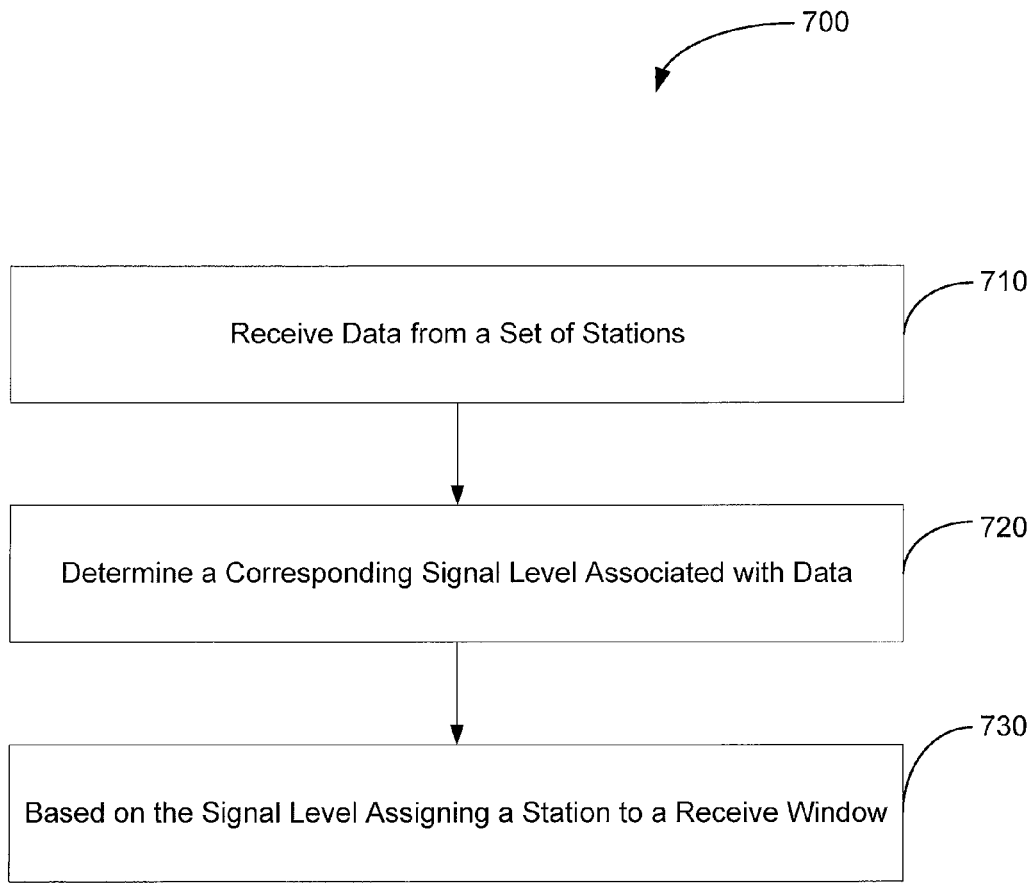
FIG. 7 is a flow diagram of an example method that may be implemented at an access point.

FIG. 7 is a flow diagram of an example method 700 that may be implemented at access point 402. Method 700 may be implemented using machine executable instructions that host 406 may execute to perform grouping to stations based on the RSSI of received radio frequency signals.

At block 710, access point 402 may receive uplink data transmitted by its wireless client devices during an uplink data frame. The uplink data from the wireless client devices may be received over the course of several uplink data frames. In some scenarios, the wireless client devices may have be previously grouped. In these scenarios, uplink data from each group may be received during respective uplink data frames.

At block 720, for each station scheduler 414 of access point 402 may receive one or more signal characteristics such as RSSI values for radio frequency signals corresponding to data received from the station. The RSSI values may be computed by receiver TX/RX 420.

At block 730, scheduler 414 may retrieve data stored in table 450 of FIG. 4. As previously explained, the data stored in table 450 may correspond to a set of entries where each entry is associated with a group identifier, a minimum and a maximum RSSI value. If the RSSI values for a station lie between the minimum and maximum RSSI value of an entry, scheduler 414 may associate the station with the group associated with the entry. Scheduler 414 may assign each group to a corresponding uplink frame. As previously discussed, the group assignment may be communicated to the stations in the broadcast frame 310 (FIG. 3). As previously discussed, stations assigned to a group transmit during their assigned uplink frame. In another embodiment, scheduler 414 may group stations dynamically based on their RSSI values.

Figure 8:
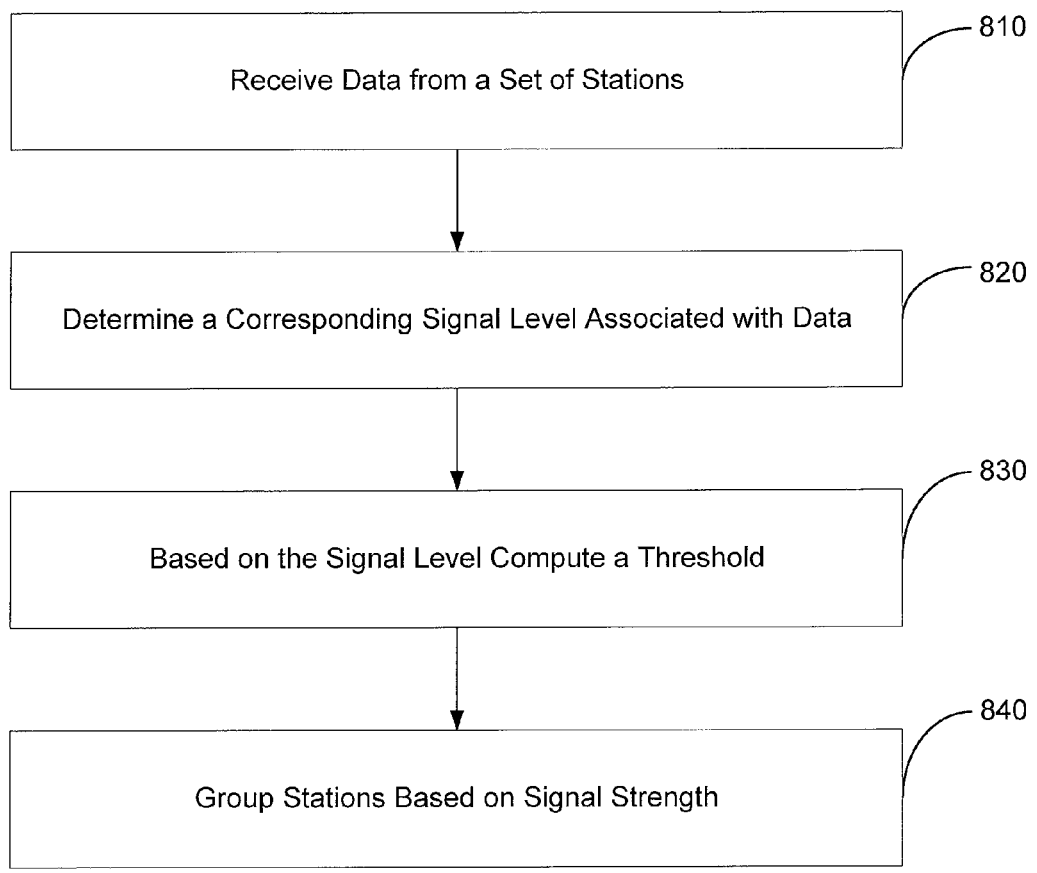
FIG. 8 is a flow diagram of another example method that may be implemented at an access point.

FIG. 8 is a flow diagram of an example method 800 that may be implemented in access point 102, for example, to perform dynamic allocation of stations to uplink frames, in an embodiment.

At block 810, access point 402 may receive uplink data transmitted by its wireless client devices during an uplink data frame, 210 for FIG. 2, for example. The uplink data from the wireless client devices may be received over the course of several uplink data frames. In some scenarios, the wireless client devices may have be previously grouped. In these scenarios, uplink data from each group may be received during respective uplink data frames.

At block 820, for each station, scheduler 414 of access point 402 may receive one or more signal characteristics such as RSSI values for radio frequency signals corresponding to data received from each of the stations at block 810. The RSSI values may be computed by receiver TX/RX 420. In an embodiment, the respective data received from each station may include the power level at which the respective data was transmitted by the respective station. The difference between the computed RSSI for the radio frequency received from a station and the power level determined from the decoded data may be used to determine the channel characteristics or attenuation.

At block 830, a threshold RSSI level may be calculated based on the respective RSSI signal strength computed from respective received radio frequency signals from the stations associated with the access point and from neighboring stations not associated with the access point. An example method of calculating the threshold may include computing an average (mean) based on the computed RSSI signal strengths. The average may correspond to the threshold. In another example, at block 830, more than one threshold may be determined. For example, standard deviation (SD) values may be calculated. The −1 SD value, the mean and the +1 SD value may correspond to a first threshold, second threshold and third threshold, respectively, in this embodiment. Other mathematical methods of calculating the threshold may be used. Also, at block 830, in an embodiment, table 450 and 452 of FIG. 4 may be generated and populated with the calculated threshold value(s). In one embodiment, receiver settings may be determined corresponding to the threshold(s).

In another embodiment, the threshold may correspond to average RSSI signal strengths of radio frequency signal transmissions received from neighboring stations not associated with the access point. In yet another embodiment, at block 830, the threshold may be adjusted to normalize the distribution of stations above and below the threshold.

At block 840, the stations may be grouped based on their respective computed RSSI signal strengths. As an example, in the scenario where a single threshold such as the mean is utilized. Stations with computed RSSI signal strengths below the mean may be assigned to a first group (first uplink frame) and stations with computed RSSI signal strengths above the mean may be assigned to a second group (second uplink frame). In one embodiment, receiver settings may be determined that are applied to the receiver during the first uplink frame and the second uplink frame.

At block 840, as previously discussed, the group assignment may be communicated to the stations in the broadcast frame 310 (FIG. 3). As previously discussed, stations assigned to a group transmit during their assigned uplink frame. The method 800 may be periodically executed to account for changing channel characteristics, in an embodiment. In another embodiment, the method may be executed whenever a new station establishes communication with the access point.

Figure 9:
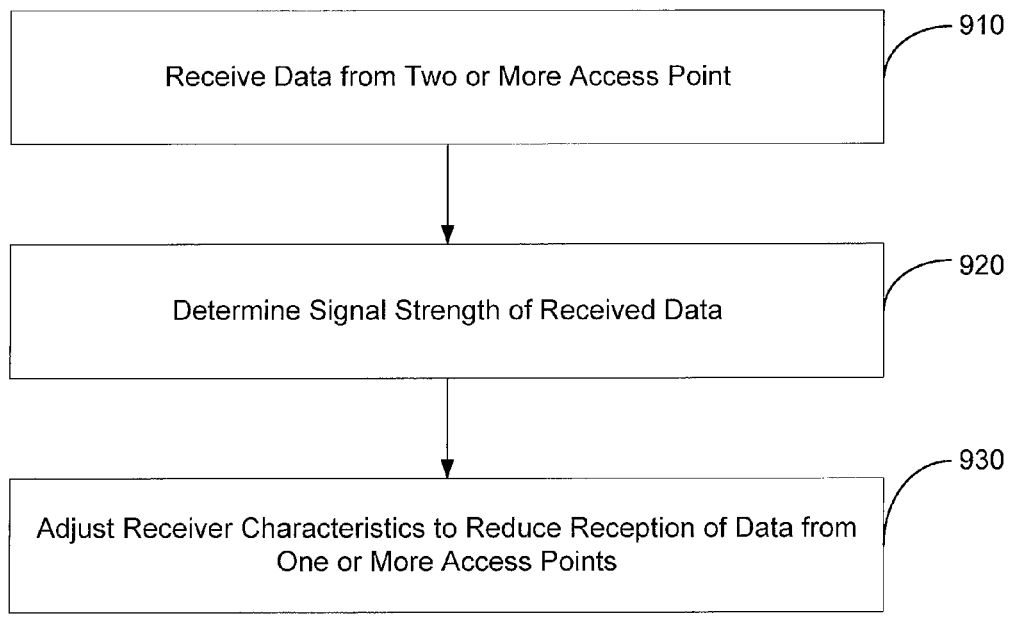
FIG. 9 is a flow diagram of an example method that may be implemented at a station.

FIG. 9 is a flow diagram of an example method 900 that may adjust the receiver characteristics of a station, 102-1 for example, to improve the reception of radio signals from access point 102 that the station 102-1 is in communication with and to reduce the reception of radio signals from neighboring access point 106, for example. By way of example and without limitation the method 900 is implemented at a station. The method 900 may also be implemented in an access point such as access point 102.

At block 910, receiver (TX/RX 432 of FIG. 4) of station 102 for example may receive radio frequency signals corresponding to one or more downlink data frames. A downlink data frame may be received from access point 102 and access point 106, for example during the same downlink frame period in an embodiment.

At block 920, the received radio frequency signals may be decoded and demodulating. The decoded data may be analyzed to determine the identity of the access points or stations that transmitted the respective downlink data frames. For example, at block 920 based on the determined respective identity of the wireless devices that transmitted the respective radio frequency signals, station 102-1 may conclude that the first downlink frame was received from access point 102 and the second downlink data frame was received from access point 106. As was discussed in FIG. 1, station 102-1 is communicatively coupled to access point 102. Therefore, the downlink data frame from access point 102 may include information for station 102-1. The downlink data frame from access point 106 comprises interference for station 102-1.

At block 920, respective RSSI signal levels may be determined for the radio frequency signals corresponding to the downlink data frames received from access points 102 and 106.

At block 930, receiver characteristics for receiver of TX/RX 432 may be adjusted based on the determined RSSI signal levels. As previously discussed, the noise floor level of receiver of TX/RX 432 may be elevated above the RSSI level of the radio frequency signals corresponding to the downlink data frames received from access points 106 during the start of a subsequent downlink data frame, in an embodiment As a result the downlink data frame from access point 106 will not be received or the RSSI level for the radio frequency signals corresponding to downlink data frame from 106 will be caused to be sufficiently attenuated so that it will not be decoded. This reduces the interference effects of downlink data frame from access point 106.

The preceding method may be implemented in a point to point (PTP), ad-hoc or back haul scheme. In a PTP scheme, two stations, 102-1 and 102-2 for example, are configured to establish a communication channel exclusively between the two stations. In other embodiments, methods described herein may be implemented in the network controller 124 of FIG. 1. In these embodiments, the access points may communicate RSSI measurements to the network controller 124 and network controller may generate the above described grouping scheme and communicate the grouping scheme to the access points to implement. In this embodiment, the network controller 124 may utilize the committed data rates that the network provider is contractually obligated to provide to the stations in determining the grouping scheme. Thus, for example, the network controller 124 may appropriately cause, for example, the noise floor to be elevated at an access point, to prevent an excessive reduction/degradation in data throughput.

Each of the methods described herein may be encoded in a computer-readable storage medium (e.g., a computer memory), programmed within a device (e.g., one or more circuits or processors), or may be processed by a controller or a computer. If the processes are performed by software, the software may reside in a local or distributed memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

The invention claimed is:

1. A method for communication via a radio frequency channel between a wireless access point and a set of wireless stations that are clients of the wireless access point, the method comprising:
    identifying, by the wireless access point, a first subset of wireless stations from the set of wireless stations, wherein each of the set of wireless stations is associated with a respective Received Signal Strength Intensity (RSSI) value at the access point and wherein the respective RSSI value associated with each of the wireless stations comprising the first subset exceeds an RSSI threshold;
    assigning, by the wireless access point, the first subset of wireless stations to a first reception window; and
    causing, by the wireless access point, a transmission of an identifier of each of the subset of wireless stations and an identifier of the first reception window wherein the transmission occurs during a first transmission window via the radio frequency channel;
    wherein the RSSI threshold is determined on a basis comprising RSSI values corresponding to signals received as interference at the access point from further wireless stations that are not clients of the access point, the further wireless stations being in communication with another access point; and
    determining a change for a receiver characteristic of a receiver of the wireless access point and causing the receiver to apply the change to the receiver characteristic before a start of the first reception window, the magnitude of the change being on a basis comprising the RSSI values corresponding to the signals received as interference at the access point from the further wireless stations that are not clients of the wireless access point, whereby to prevent the access point from decoding and synchronising to the signals received from the further wireless stations.

2. The method of claim 1 further comprises assigning a second subset of wireless stations to a second reception window wherein the respective RSSI associated with each of wireless stations comprising the second subset is below the RSSI threshold.

3. The method of claim 2 wherein the RSSI threshold is determined on a basis comprising the respective RSSI values associated with each of the set of wireless stations.

4. The method of claim 3 wherein identifying the first subset of wireless stations comprises determining that an RSSI value corresponding to a signal received from a wireless device via the radio frequency channel exceeds a level.

5. The method of claim 4 wherein a magnitude of the change for the receiver characteristic is on a basis further comprising the respective RSSI values associated with each of the first subset of wireless stations.

6. The method of claim 2 wherein the first transmission window corresponds to an uplink portion of a time division duplex frame and the first reception window corresponds to a downlink portion of the time division duplex frame.

7. A wireless access point comprising:
    a receiver configured to receive data from each of a set of wireless stations that are clients of the wireless access point via a radio frequency channel and generate a respective Received Signal Strength Intensity (RSSI) value for each of the set of wireless stations based on data received from each of the set of wireless stations;
    a transmitter configured to transmit data to the set of wireless stations via the radio frequency channel; and
    a scheduler, in communication with the receiver and the transmitter, the scheduler configured to (i) identify a first subset of wireless stations from the set of wireless stations, wherein the respective RSSI value for each of the wireless stations of the first subset exceeds an RSSI threshold and (ii) assign the identified first subset of wireless stations to a first reception window;
    wherein the RSSI threshold is determined on a basis comprising RSSI values corresponding to uplink signals received at the access point from further wireless stations that are not clients of the access point, the further wireless stations being in communication with another wireless access point; and
    wherein the scheduler is configured to apply a change to a receiver characteristic of the receiver before a start of the first reception window, the magnitude of the change being on a basis comprising the RSSI values corresponding to the signals received at the access point from the further wireless stations that are not clients of the wireless access point, whereby to prevent the access point from decoding and synchronising to the signals received from the further wireless stations.

8. The wireless access point of claim 7 wherein the scheduler is configured to cause the transmitter to transmit an identifier of each wireless station of the first subset of wireless stations and an identifier of the first reception window wherein the transmission occurs during a first transmission window via the radio frequency channel.

9. The wireless access point of claim 8 wherein the scheduler is configured to determine the RSSI threshold on a basis further comprising the respective RSSI values for each of the set of wireless stations.

10. A method for communication via a radio frequency channel between a wireless access point and a set of wireless stations that are clients of the wireless access point, the method comprising:

identifying, at the wireless access point, a first subset of wireless stations from the set of wireless stations, wherein each of the set of wireless stations is associated with a respective RSSI (Receive Signal Strength Intensity) value at a receiver at the access point and wherein the respective RSSI value associated with each of the wireless stations comprising the first subset exceeds an RSSI threshold;

assigning, at the wireless access point, the first subset of wireless stations to a first reception window; and setting, at the wireless access point, a minimum discernible signal level of the receiver for the first reception window, wherein the minimum discernible signal is above the RSSI threshold;

wherein the RSSI threshold is based on RSSI values corresponding to uplink signals received at the access point from further wireless stations that are not clients of the access point, the further wireless stations being in communication with another wireless access point; and determining a change for a receiver characteristic of a receiver of the wireless access point and causing the receiver to apply the change to the receiver characteristic before a start of the first reception window, the magnitude of the change being on a basis comprising the RSSI values corresponding to the signals received at the access point from the further wireless stations that are not clients of the wireless access point, whereby to prevent the access point from decoding and synchronising to the signals received from the further wireless stations.

11. The method of claim 10, further comprising causing a transmission of an identifier of each of the subset of wireless stations and an identifier of the first reception window wherein the transmission occurs during a first transmission window via the radio frequency channel.

12. The method of claim 10, further comprising:
assigning a second subset of wireless stations to a second reception window wherein the respective RSSI associated with each of wireless stations comprising the second subset is below the RSSI threshold.

13. The method of claim 12, wherein the RSSI threshold is determined based on the respective RSSI values associated with each of the set of wireless stations.

14. The method of claim 13, wherein identifying the first subset of wireless stations comprises determining that an RSSI value corresponding to a signal received from a wireless device via the radio frequency channel exceeds a level.

15. The method of claim 10, wherein a magnitude of the change is on a basis further comprising the respective RSSI values associated with each of the first subset of wireless stations.

* * * * *